United States Patent [19]
Heindel et al.

[11] Patent Number: 5,655,118
[45] Date of Patent: Aug. 5, 1997

[54] METHODS AND APPARATUS FOR MANAGING INFORMATION ON ACTIVITIES OF AN ENTERPRISE

[75] Inventors: Lee Edward Heindel, Bernardsville; Vincent Alan Kasten, Fanwood; Karl Johannes Schlieber, Flemington, all of N.J.

[73] Assignee: Bell Communications Research, Inc., Morristown, N.J.

[21] Appl. No.: 215,756

[22] Filed: Mar. 21, 1994

[51] Int. Cl.$^6$ .............................. G06F 17/30; G06F 7/00
[52] U.S. Cl. ..................... 395/614; 395/603; 395/604; 395/606; 395/611; 395/202; 395/203; 395/214
[58] Field of Search ................ 395/600; 364/419.19, 364/461; 382/13

[56] References Cited

U.S. PATENT DOCUMENTS

| | | | |
|---|---|---|---|
| Re. 34,476 | 12/1993 | Norwood | 382/13 |
| 4,875,162 | 10/1989 | Ferriter et al. | 364/401 |
| 5,321,610 | 6/1994 | Breslin | 364/419.19 |

OTHER PUBLICATIONS

Microsoft Project, "Project for Windows", Version 3.0 (manufactured by Microsoft Corporation of Seattle, Washington), no date.

"User's Reference, Microsoft Project, Business Project & Planning System", Version 3.0 for Apple, Macintosh Series, or Windows Series, 1992 Microsoft Corporation.

Katherine Koerner, "Lotus–Compatible Software Projects", IAC Computer Database (Lotus), Jan. 1, 1987.

*Primary Examiner*—Thomas G. Black
*Assistant Examiner*—Cheryl Lewis
*Attorney, Agent, or Firm*—Joseph Giordano; Loria B. Yeadon

[57] ABSTRACT

A system for maintaining various information representative of activities of an enterprise having four components. The first component creates the information including project data, subproject data, task data, and employee data. The second component stores the project data, the subproject data, the task data, and the employee data. The third component creates non-hierarchical relationship keys among the project data, the subproject data, the task data, and the employee data stored by the storing means; and the fourth component updates the project data, the subproject data, the task data, and the employee data stored by the storing means and for updating the relationship keys among the project elements, the subproject elements, the task elements, and the employee elements.

13 Claims, 4 Drawing Sheets

METHODS AND APPARATUS FOR MANAGING INFORMATION ON ACTIVITIES OF AN ENTERPRISE

BACKGROUND OF THE INVENTION

This invention relates to aligning the activities of an enterprise by managing abstract representations of the enterprise's activities in a database. The invention facilitates the management of abstract representations of activities of an enterprise through a single enterprisewide database that models the activities of the enterprise.

DESCRIPTION OF RELATED ART

Enterprises (e.g., corporations and public and private agencies) are typically staffed using hierarchies with people assigned to different management levels having responsibilities corresponding to their management levels. Some people, called corporate officers or strategic planners, develop strategic plans or goals for the enterprise that are implemented by executive and lower management as well as other lower level employees executing various tasks. Examples of strategic plans are: to enter the telecommunications business and to enter the personal computer business.

After the strategic planners identify strategic plans, they communicate the plans to, for example, executive management. The executive managers, using the strategic plans, identify products (or services) that may fit into and accomplish goals set by the planner' strategic plans. In the example of a strategic plan to enter the telecommunications business, an example service might be to build a telephone switching network; while the strategic plan for entering the personal computer business might call for identifying products such as a type of display and a personal computer platform.

The executive managers then communicate the selected product (or service) information to lower management, for example, project managers who manage lower level employees. The project managers specify projects for each product, and assign certain lower level employees to one or more projects. For example, building a telephone switching network would include projects like identifying a location for the network and selecting components to be used in the network. Manufacturing LCD and CRT monitors and Intel and PowerPC microprocessor-based personal computer platforms are examples of projects for the personal computer business strategic plan.

The project managers also identify tasks relating to each project, and assign lower level employees to perform the tasks. Tasks in the exemplary personal computer business might include building circuit boards for the Intel microprocessor-based personal computer platform, and tasks for the exemplary telecommunications business might include purchasing examples of components capable of being used in a telephone switching network.

In a typical enterprise environment the lower level employees inform the project managers of their progress on tasks for assigned projects, and the project managers provide updated information on the progress of projects to the executive managers who in turn provide updated information on the progress of products to the corporate officers or strategic planners. Because of this type of hierarchical staffing structure, conventional project management systems, for example, PROJECT FOR WINDOWS™ (manufactured by MICROSOFT Corporation of Seattle, Wash., U.S.A.), manage information (or data) in a logically hierarchical fashion. Furthermore, these conventional project management systems use a hierarchical approach to manage information on only a subset of the activities of an enterprise. Thus, they permit only activity information on projects and subprojects to be related to activity information on tasks. The task activity information includes the identity of the employee(s) assigned to the task. Activity information on projects can be tracked as accretions of subproject activity information and task activity information, and the task activity information subsequently tracked by activity information on the employee assigned to perform each task. This relationship of activity information for tasks, subprojects, and projects is illustrated in FIG. 1.

In FIG. 1, the elements 10–30 represent activity information relating to lower order activities of an enterprise that is managed in a logically hierarchical fashion by conventional project management systems. The activity information on the projects 10 is keyed (or linked) to the activity information on subprojects 20 with an arrow pointing toward the subprojects 20. The arrow indicates that one or more of the subprojects 20 may be related to only one of the projects 10. Similarly, the activity information on subprojects 20 is linked to the activity information for tasks 30 with an arrow pointing toward the activity information for tasks 30 to indicate that one or more of the tasks 30 may be related only to one of the subprojects 20. The activity information for each one of the tasks 30 includes the identity of the employee assigned to the task as well as the amount of time estimated for performing the task.

With these conventional project management systems, however, activity information on tasks 30 of projects 10 cannot be related to activity information on higher order activities, i.e., other tasks which relate to other subprojects 20 or to other projects 10. For instance, activity information on the project involved with evaluating construction bids for a light bulb manufacturing facility cannot be related to activity information on the enterprise's strategy to enter the light bulb manufacturing business. Due to disconnects such as this, it is impossible to relate activity information on the enterprise's other tasks and associated people with other higher-order activities using conventional project management systems.

Another drawback with conventional project management systems is that, by treating each project as an individual, unconnected (or unrelated) object, it is extremely hard to answer questions such as: identify all projects a particular individual is currently working on? As described with reference to FIG. 1, activity information on tasks 30 includes the identity of employees assigned to each task as well as the amount of time estimated for performing the task. Thus, to identify all projects 10 an individual is committed to work on using conventional project management systems would require a search of the activity information for all tasks 30.

Another example of a relationship that cannot be represented in any conventional project management system that represents activity information using logical, hierarchical relationships exclusively, is when two higher order activities, for example, strategies, are related to the same lower order activity, for example, a project. For instance, one enterprise strategy may involve entering the light bulb manufacturing factory, while another may involve the manufacture of lights and the need to purchase large amounts of light bulbs. Clearly, someone at a high position in the staff of a hierarchically organized enterprise would know about both strategies, and could ensure that activities for the two strategies are aligned. However, conventional project management systems are not able to represent all the interrelationships of the activity information for the strategies and other higher-order activities with all of the lower-order activities.

OBJECTS AND SUMMARY OF THE INVENTION

Accordingly, the present invention is directed to an enterprise management system that obviates one or more of the problems due to limitations and disadvantages of the related art.

Features and advantages of the invention will be set forth in the description which follows, and in part will be apparent from the description, or may be learned by practice of the invention. The objectives and other advantages of the invention will be realized and attained by the method and apparatus particularly pointed out in the written description and claims thereof as well as the appended drawings.

To achieve the objects of this invention and attain its advantages, broadly speaking, this invention maintains various information representative of activities of an enterprise using four components. The first component is a means for creating the information including strategy data, product data, project data, subproject data, task data, and employee data. The second component is a means for storing the strategy data, the product data, the project data, the subproject data, the task data, and the employee data. The third component is a means for creating non-hierarchical relationship keys among the strategy data, the product data, the project data, the subproject data, the task data, and the employee data stored by the storing means; and the fourth component is a means for updating the strategy data, the product data, the project data, the subproject data, the task data, and the employee data stored by the storing means and for updating the relationship keys among the strategy data, the product data, the project elements, the subproject elements, the task elements, and the employee elements.

It is to be understood that both the foregoing general description and the following detailed description are exemplary and explanatory and are intended to provide further explanation of the invention as claimed.

BRIEF DESCRIPTION OF THE DRAWINGS

The accompanying drawings which are incorporated in and which constitute part of this specification, illustrate a presently preferred embodiment and implementation of the invention and, together with the description, serve to explain the principles of the invention.

In the drawings.

DETAILED DESCRIPTION OF THE PREFERRED IMPLEMENTATIONS

Reference will now be made in detail to the preferred implementations of the present invention as illustrated in the accompanying drawings. Whereever possible, the same reference numbers will be used throughout the drawings and the following description to refer to the same or like parts.

To successfully align all activities of an enterprise, including higher-order activities (like strategies, and products) and lower-order activities (like projects, subprojects, tasks, and employees), an enterprise management system must manage abstract representations (activity information or data) of all the tasks being performed by individuals within the enterprise. Such a system must also contain abstract representations (relationship information or keys) of how all activities relate to each other and to various strategies, products, projects, subprojects, and tasks of the enterprise, and to the people that are responsible for performing them.

Figure 1:
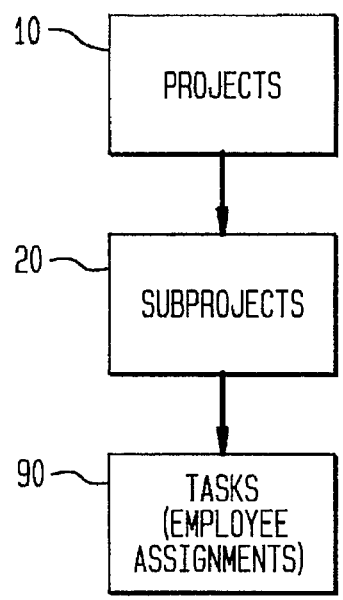
FIG. 1 is block diagram illustrating activity information managed by conventional project management systems (prior art)
Figure 2:
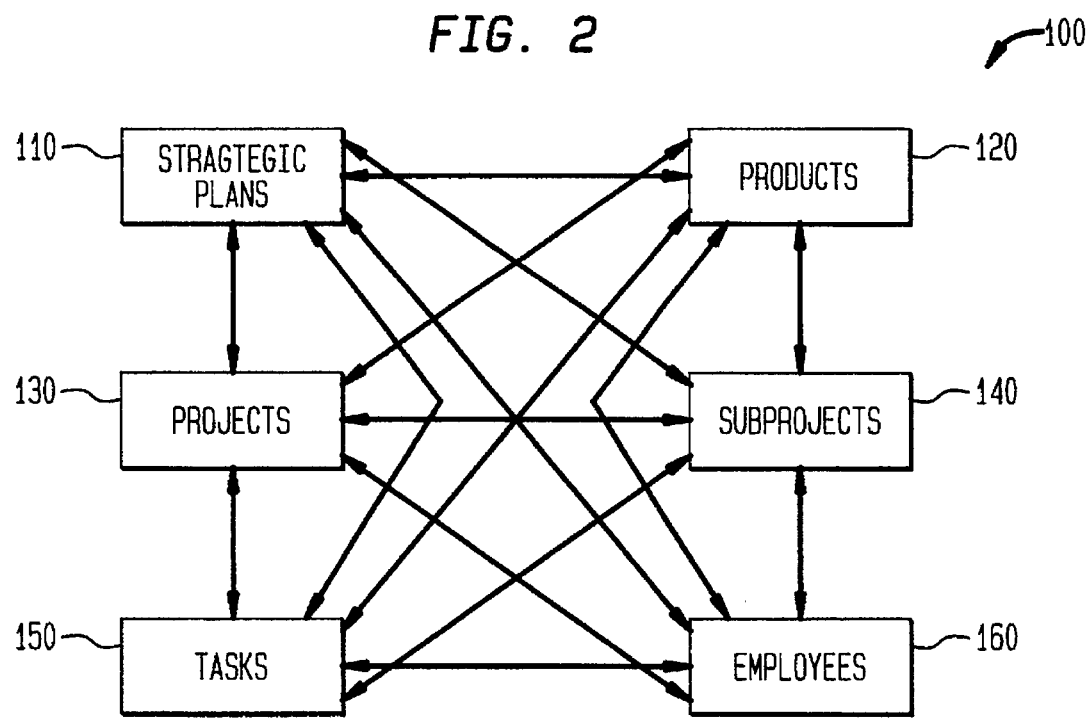
FIG. 2 is block diagram illustrating activity information managed by the preferred implementation of the present invention and the interrelationships between the activity information.

For instance, an enterprise's strategy may be to enter into the light bulb manufacturing business. This could lead to the goal (or project) of building a state-of-the-art light bulb manufacturing facility, subprojects to evaluate construction bids and oversee the selected contractors, and tasks like manufacturing light bulbs. To successfully manage information on this enterprise, an enterprise management system must connect information on each of the activities related to a strategy with information on a person that performs the activity. FIG. 2 is a block diagram illustrating activity information 100 managed by the preferred implementation of the present invention and the interrelationship of the activity information 100. The activity information 100 includes groups of activity information data elements on strategic plans 110, products 120, projects 130, subprojects 140, tasks 150, and employees 160. Each of the strategic plans 110 includes data on a strategic plan of an enterprise. Likewise, each of the products 120 includes data on a product of the enterprise; each of the projects 130 includes data on a project of the enterprise; each of the subprojects 140 includes data on subprojects of the enterprise; each of the tasks 150 includes data on tasks of the enterprise; and each of the employees 160 includes data on employees of the enterprise.

The arrows connecting the elements 110–160 show how the elements 110–160 of activity information 100 can interrelate. As explained above, strategic planners make strategic plans 110, product managers identify products 120, project managers identify projects 130, subprojects 140, and tasks 150, and assign employees 160 to perform the tasks. Of course strategic planners, product managers, and project managers are also employees, only their tasks (i.e., developing strategic plans, products, projects, and subprojects) differ from the tasks performed by other, lower-level employees. This is why there are keys (or relationships) shown in FIG. 2 between employees 160 and all of the other elements 110–150. Additionally, the arrows connecting the elements 110–160 are all two-headed arrows, which indicate many bidirectional relationships may exist between the elements 110–160. Thus, information on two strategic plans (represented by element 110) may relate to any single product (represented by element 120) or to any single employee (represented by element 160).

For example, a change in information on a strategic plan 110, or the addition of information on a new strategic plan 110, may affect none, one, many, or all of the other elements 120–160. Such a change or addition may also affect none, one, many, or all of the other strategic plans 110. The same is true for the change of information or the addition of information, on a new product, project, subproject, task, or employee.

Figure 3:
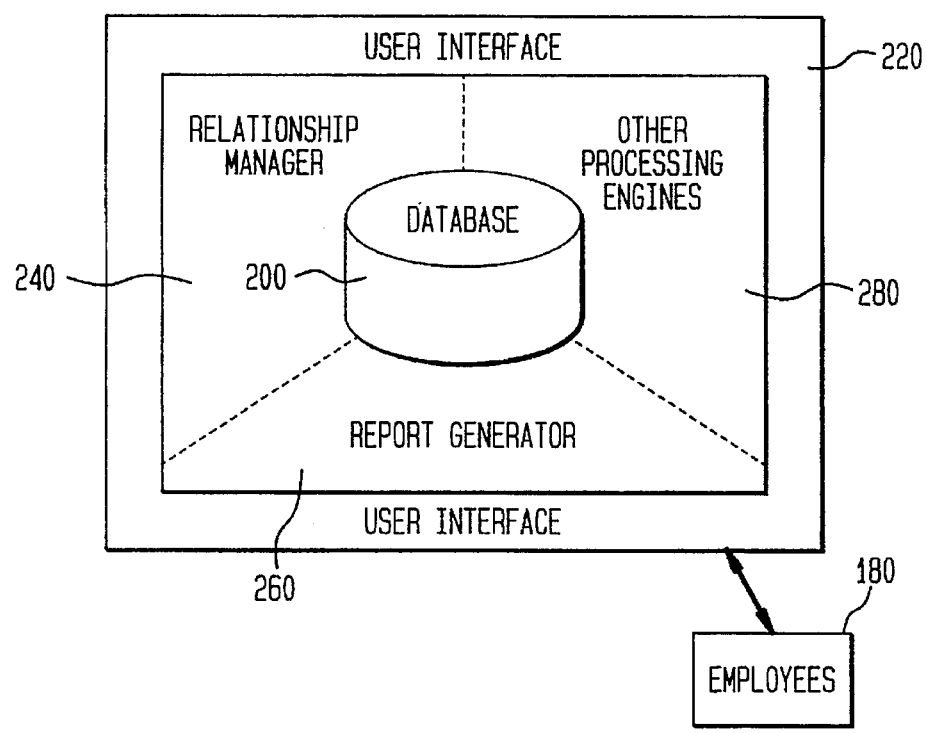
FIG. 3 is a block diagram illustrating the components of an enterprise using the preferred implementation of the present invention.
Figure 4:
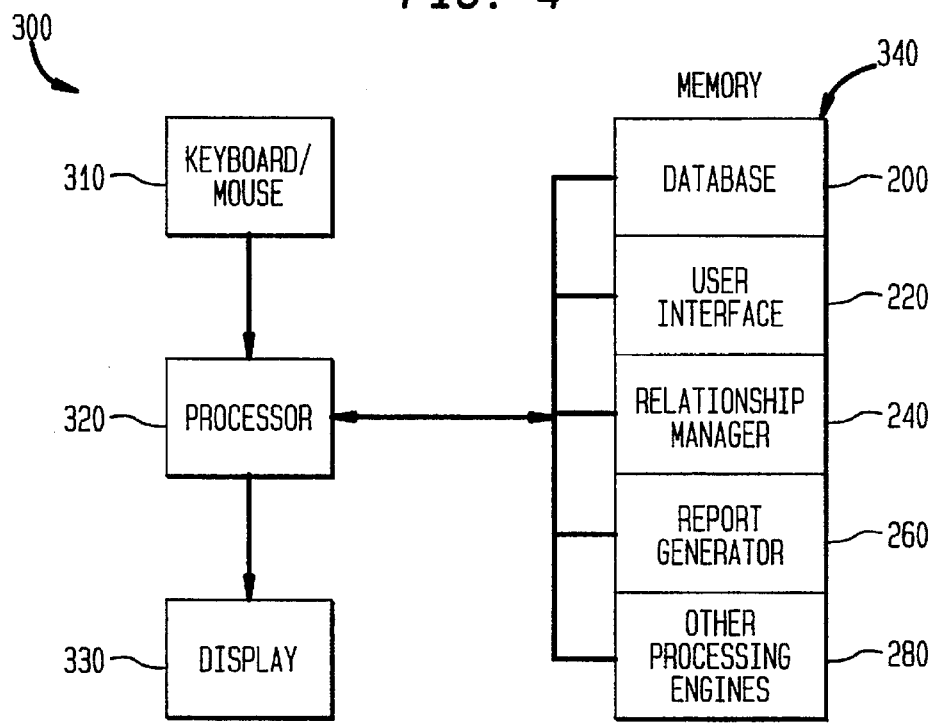
FIG. 4 is a block diagram illustrating an exemplary workstation or platform in which the present invention may be implemented.

Referring to FIGS. 3 and 4, the preferred implementation of the present invention will be described. The present invention is implemented using a central, relational database 200 and related processes to facilitate communication of information among employees 180 (including the strategic planners, product managers, project managers, and lower-level employees). The related processes include the user interface 220, relationship manager 240, report generator 260, and other processing engines 280.

The present invention is implemented in a personal computer, for example, IBM-compatible personal computer. As shown in FIG. 4, the personal computer 300 includes a keyboard/mouse 310, processor 320, display 330, and memory 340. The keyboard/mouse 310 can be any standard keyboard and mouse connectable to the processor 320. The processor 320 can be any standard and commonly known central processing unit (e.g., 80386 microprocessor manufactured by Intel Corporation of Dallas, Tex., U.S.A.), and the display 330 can be any standard display connectable to the processor 320. The memory 340 can include magnetic core, semiconductor RAM, magnetic disks, magnetic tapes, and other magnetic and optical storage medium accessible by the processor 320.

The processor 320 is connected to the keyboard/mouse 310 for receiving input from the keyboard/mouse 310. The processor 320 is connected to the display 330 for presenting images on the display 330.

The memory 340 includes the database 200, user interface 220, relationship manager 240, and report generator 260. The memory 340 may also include other processing engines 280. The processor 320 operates by accessing one or more of the user interface 220, relationship manager 240, report generator 260, and other processing engines 280 at a time to retrieve instructions, which it then executes. During execution of instructions, the processor may also access the database 200 in addition to receiving input signals and presenting images.

The database 200 is a relational database that acts as a repository for activity information 100, including activity information data elements for strategic plans 110, products 120, projects 130, subprojects 140, tasks 150, and employees 160. Not only does the database 200 store these data elements, but it also stores information on the relationship between the data elements. The database 200 supports the many bidirectional relationships between the data elements on strategic plans 110, products 120, projects 130, subprojects 140, tasks 150, and employees 160, which was explained briefly with reference to FIG. 2.

The user interface 220 is preferably built with ACCESS™ (manufactured by Microsoft Corporation of Seattle, Wash., U.S.A.) and enables users (e.g., employees 180 and systems managers) to view, access, retrieve, and manipulate activity information 100 stored in the database 200 using the relationship manager 240, report generator 260, and the other processing engines 280. The user interface 220 uses standard SQL queries that are well known in the art.

The functions of the relationship manager 240 are not, however, conventional. The processor 320, using relationship manager 240, manages the relationships between the information on activities stored in the database 200. This includes permitting users to retrieve, add, modify, and delete activity information data elements on activities and relationships between activities of an enterprise represented in the database 200. These functions will be explained in detail below.

Using the report generator 260, the processor 320 enables users to generate reports from activity information 100 stored in the database 200. The reports may be custom made by the users, or a set of predefined reports may be included with the report generator 260. The steps for generating custom-made or predefined reports are well known. Using the other processing engines 280 that include application programs, for example, word processing programs and spread sheet programs, the processor 320 enables users to interface with the database 200 and use the activity information 100 stored in the database 200. A user may compose an article on activity information from the database 200 using a word processing system. The functions of the report generator 260 and processing engines 280, and the methods of performing these functions, are also conventional.

Figure 5:
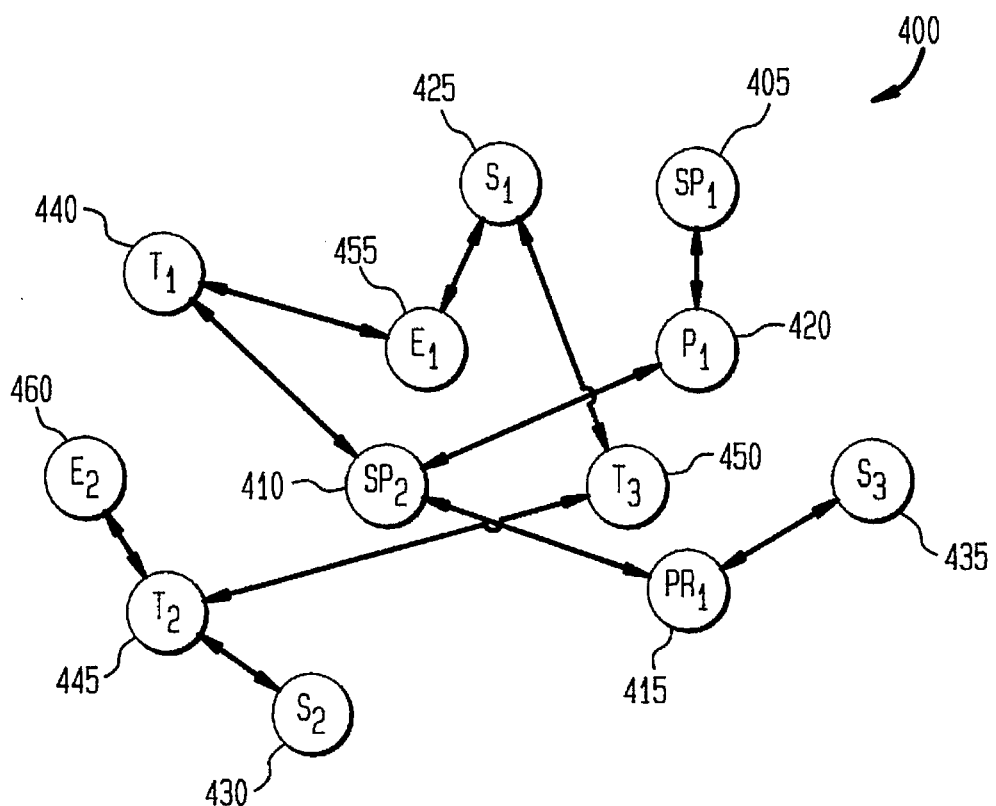
FIG. 5 is a diagram used to illustrate example elements of activity information and relationships between the elements that may be stored in the database of FIGS. 3 and 4.

FIG. 5 illustrates examples of activity information data elements 400 that may be stored in the database 200 of FIGS. 3 and 4. FIG. 5 shows that the database 200 stores activity information data elements on strategic plans ($SP_1$ 405 and $SP_2$ 410), products ($PR_1$ 415), projects ($P_1$ 420), subprojects ($S_1$ 425, $S_2$ 430, $S_3$ 435), tasks ($T_1$ 440, $T_2$ 445, $T_3$ 450), and employees ($E_1$ 455, $E_2$ 460). FIG. 5 also illustrates examples of relationships between the data elements 400 on the strategic plans, products, projects, subprojects, tasks, and employees stored in database 200. It is important to note that the activity information data elements 400 do not rely on hierarchical constructs where strategic plan (SP) elements relate to one or more product (PR) elements that relate to one or more project (P) elements that relate to one or more subproject (S) elements that relate to one or more task (T) elements that relate to one or more employee (E) elements.

Rather, in the example activity information 400 shown in FIG. 5, the strategic plan element $SP_1$ 405 relates to the project element $P_1$ 420 that relates to the second strategic plan element $SP_2$ 410. $SP_2$ 410 relates to the product element $PR_1$ 415 that relates to the subproject element $S_3$ 435. The strategic plan element $SP_2$ 410 relates to the task element $T_1$ 440 that relates to employee element $E_1$ 455. $E_1$ 455 relates to the subproject element $S_1$ 425 that relates to task element $T_3$ 450. $T_3$ 450 relates to the task element $T_2$ 445 that relates to both employee element $E_2$ 460 and subproject element $S_2$ 430. It is apparent from this example of activity information data elements 400 that strategic plan elements do not necessarily only relate directly to product elements, but they can also relate to project elements, subproject elements, task elements, employee elements, as well as other strategic plan elements. Similarly, product elements may relate to any one or more of the following: strategic plan elements, product elements, project elements, subproject elements, task elements, and employee elements. The remaining elements, projects, subprojects, tasks, and employees may also relate to any one or more of the following: strategic plan elements, product elements, project elements, subproject elements, task elements, and employee elements. Thus, activity information data elements are stored in the database 200 using a non-hierarchical, entity relationship model, as opposed to the hierarchical models employed by conventional project management systems.

Figure 6:
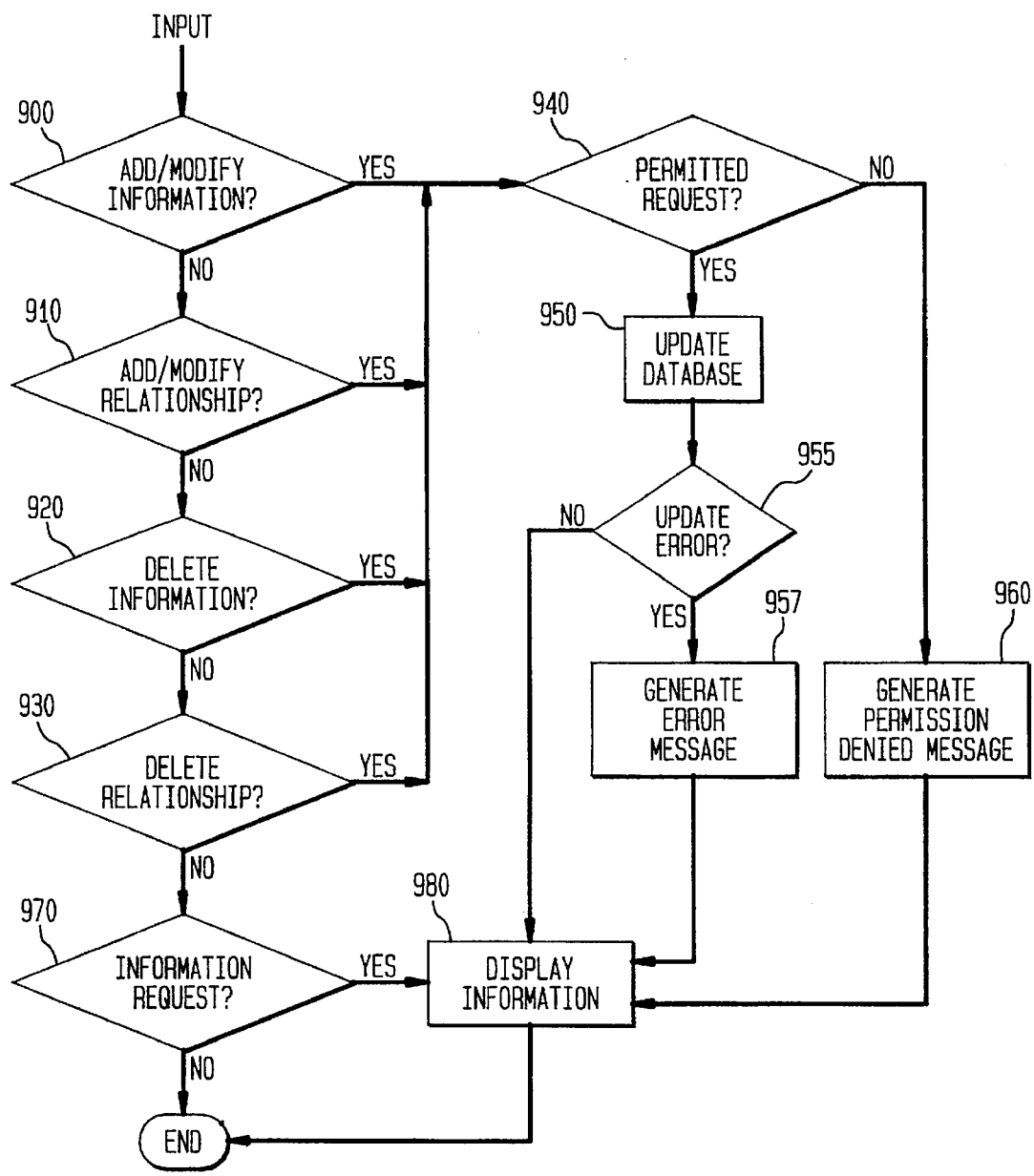
FIG. 6 is a flow chart showing the steps used by the relationship manager of FIGS. 3 and 4 to manage the activity information (including relationships) in the database.

Referring to FIG. 6 the steps of the preferred process of the relationship manager 240 will now be explained. Using the user interface 220, the user inputs requests via the keyboard/mouse for the processor 320 to perform certain of the functions of the relationship manager 240. If the user asks the relationship manager 240 to add/modify information on an activity in the database 200 (step 900), add/ modify relationships between activities represented in the database 200 (step 910), delete information on an activity in the database 200 (step 920), or delete relationships between activities represented in the database 200 (step 930), then the relationship manager 240 determines in step 940 whether the user is permitted to alter the database 200 in the manner requested. For example, in certain instances employees may not be permitted to alter activity information 100 and interrelationships stored in the database 200, for example, strategic plans, and relationships between those activities and other activities, for example, product information represented in the database 200. However, other users, for example, enterprise managers, may require complete add/ modify/delete access to all activity information 100 and interrelationships in the database 200.

If, in step 940, the relationship manager 240 determines that the user is not permitted to perform his/her request on the database 200, then the relationship manager 240 generates a message (step 960) informing the user that the input request is not one that he/she is permitted to perform on the database 200 and displays the message on the display 330 (step 980).

If the user is permitted to perform his/her request, the relationship manager 240 attempts to update the database 200 in accordance with the input request (step 950). If the attempted update is not successful and there is an error in updating the database 200 (step 955) then an error message is generated (step 957) and displayed on the display 33 (step 980). If, however, the update step 950 is successfully completed without error (step 955), then the relationship manager 240 displays information confirming completion of the update (step 980).

If the input request merely asks for information on an activity stored in the database 200 or information on a relationship(s) of activities represented in the database 200 (step 970), then the relationship manager 240 simply displays the requested information (step 980).

Figure 7:
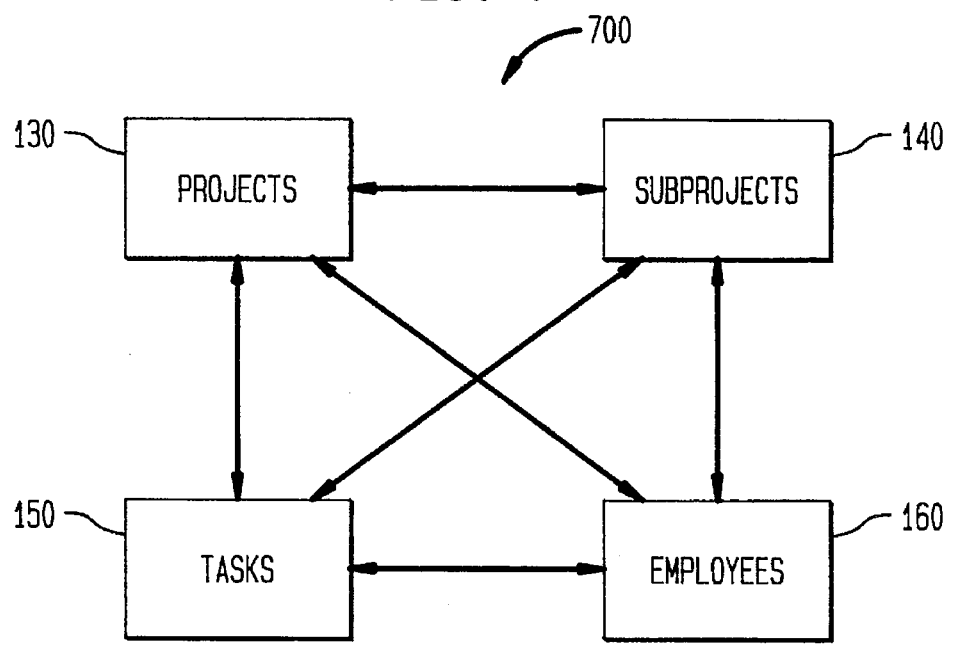
FIG. 7 is block diagram illustrating activity information managed by another preferred implementation of the present invention and the interrelationships between the activity information.

In another implementation of the present invention, the database 200 includes activity information 700 for only projects 130, subprojects 140, tasks 150, and employees 160 data elements. This is illustrated in FIG. 7 along with keys showing the relationships between data the elements 130–160. This implementation operates in a manner similar to the operation of the first-described implementation, only the database 280 is different because it includes only projects 130, subprojects 140, tasks 150, and employees 160.

Persons skilled in the art will recognize that the present invention described above overcomes problems and disadvantages of the prior art. They will also recognize that modifications and variations may be made to this invention without departing from the spirit and scope of the general inventive concept.

For example, each of the activity data elements of the activity information 100 may include additional data. The strategic plan data elements 110 may also include financial data that may be used to compare financial data between different strategic plan data elements.

Further, there may be multiple relationships between data elements. One such example would be an additional "reports to" relationship between different employee data elements 160. These "reports to" relationships would permit users to retrieve information on an enterprise's organizational structure. Another example of an additional key would be the addition of a "critical path" relationship between task data elements 150 and projects data elements 130, which would permit users to order tasks within a project.

Also, it is possible to add additional activity information to the database in the form of new groups of activity information data elements.

This invention in its broader aspects is therefore not limited to the specific details or representative methods shown and described.

We claim:

1. A system for storing and maintaining information representative of activities of an enterprise, said system comprising:

means for creating the information including project data, subproject data, task data, and employee data, wherein each of the data includes elements;

means for storing the project data, the subproject data, the task data, and the employee data;

means for creating nonhierarchical relationship keys among the project data, the subproject data, the task data, and the employee data stored by the storing means, wherein the relationship keys relate elements of the project data to each other or to elements of the subproject, task, and employee data, the relationship keys relate elements of the subproject data to each other or to elements of the project, task, and employee data, the relationship keys relate elements of the task data to each other or to elements of the project, subproject, and employee data, and the relationship keys relate elements of the employee data to each other or to elements of the project, subproject, and task data; and means for updating the project data, the subproject data, the task data, and the employee data stored by the storing means and for updating the relationship keys among the project data elements, the subproject data elements, the task data elements, and the employee data elements.

2. The system of claim 1 further comprising means for accessing the project data, the subproject data, the task data, and the employee data stored by the storing means.

3. A system for storing and maintaining activity information corresponding to activities of an enterprise, said system comprising:

means for creating the activity information including planning data, product data, project data, subproject data, task data, and employee data, wherein each of the data includes elements;

means for storing the planning data, the product data, the project data, the subproject data, the task data, and the employee data;

means for creating nonhierarchical relationship keys among the planning data, the product data, the project data, the subproject data, the task data, and the employee data stored by the storing means, wherein the relationship keys relate elements of the planning data to each other or to elements of the product, project, subproject, task, and employee data, the relationship keys relate elements of the product data to each other or to elements of the planning, project, subproject, task, and employee data, the relationship keys relate elements of the project data to each other or to elements of the planning, product, subproject, task, and employee data, the relationship keys relate elements of the subproject data to each other or to elements of the planning, product, project, task, and employee data, the relationship keys relate elements of the task data to each other or to elements of the planning, product, project, subproject, and employee data, and the relationship keys relate elements of the employee data to each other or to elements of the planning, product, project, subproject, and task data; and means for updating the planning data, the product data, the project data, the subproject data, the task data, and the employee data stored by the storing means and for updating the relationship keys among the planning data elements, the product data elements, the project data elements, the subproject data elements, the task data elements, and the employee data elements.

4. The system of claim 3 wherein the updating means includes means for accessing the planning data, the product data, the project data, the subproject data, the task data, and the employee data stored by the storing means.

5. The system of claim 3 wherein the relationship keys between the employee data and the task data are created such that a plurality of elements of employee data relate to a single element of the task data.

6. The system of claim 3 wherein the relationship keys between the task data and the subproject data are created such that a plurality of elements of task data relate to a single element of the subproject data.

7. The system of claim 3 wherein the relationship keys between the subproject data and the project data are created such that a plurality of elements of subproject data relate to a single element of the project data.

8. The system of claim 3 wherein the relationship keys between the project data and the product data are created such that a plurality of elements of project data relate to a single element of the product data.

9. The system of claim 3 wherein the relationship keys between the product data and the planning data are created such that a plurality of elements of product data relate to a single element of the planning data.

10. A system for storing and maintaining various activity information corresponding to activities of an enterprise, said memory system comprising:

means for creating the activity information including project data elements, subproject data elements, task data elements, and employee data elements;

means for storing the project data elements, the subproject data elements, the task data elements, and the employee data elements;

means for creating nonhierarchical relationship connections among the project data elements, the subproject data elements, the task data elements, and the employee data elements stored by the storing means such that two or more of the employee data elements connect to a single element of the task data elements and two or more of the task data elements connect to a single element of the subproject data elements and two or more of the subproject data elements connect to a single element of the project data elements; and means for updating the project data, the subproject data, the task data, and the employee data stored by the storing means and for updating the relationship connections among the project data elements, the subproject data elements, the task data elements, and the employee data elements.

11. A computer-implemented method for holding and maintaining information representative of activities of an enterprise in a computer having a memory, and a microprocessor, said computer-implemented method comprising the steps of:

creating the information including project data, subproject data, task data, and employee data, wherein each of the data includes elements;

storing the project data, the subproject data, the task data, and the employee data in the memory;

creating nonhierarchical relationship keys among the project data, the subproject data, the task data, and the employee data stored by the memory, wherein the relationship keys relate elements of the project data to each other or to elements of the subproject, task, and employee data, the relationship keys relate elements of the subproject data to each other or to elements of the project, task, and employee data, the relationship keys relate elements of the task data to each other or to elements of the project, subproject, and employee data, and the relationship keys relate elements of the employee data to each other or to elements of the project, subproject, and task data;

updating the project data, the subproject data, the task data, and the employee data stored by the memory; and updating the relationship keys among the project data elements, the subproject data elements, the task data elements, and the employee data elements.

12. The computer-implemented method of claim 11 further comprising the step of:

accessing the project data, the subproject data, the task data, and the employee data stored by the storing means.

13. A computer-implemented method for holding and maintaining activity information representative of activities of an enterprise in a computer having a memory, and a microprocessor, said computer-implemented method comprising the steps of:

creating the activity information including project data elements, subproject data elements, task data elements, and employee data elements;

storing the project data elements, the subproject data elements, the task data elements, and the employee data elements in the memory;

creating nonhierarchical relationship connections among the project data elements, the subproject data elements, the task data elements, and the employee data elements stored by the memory such that two or more of the employee data elements connect to a single element of task data elements and two or more of the task data elements connect to a single element of the subproject data elements and two or more of the subproject data elements connect to a single element of the project data elements; and updating the project data, the subproject data, the task data, and the employee data stored by the memory and for updating the relationship connections among the project data elements, the subproject data elements, the task data elements, and the employee data elements.

* * * * *